(12) United States Patent
Carrier et al.

(10) Patent No.: US 8,091,928 B2
(45) Date of Patent: Jan. 10, 2012

(54) COUPLING ASSEMBLY FOR CONNECTION TO A HOSE

(75) Inventors: Michael Owen Carrier, Van Wert, OH (US); Ryan Thomas Ellerbrock, Ottawa, OH (US); Glenn Martin Gregrich, Stow, OH (US); Jill Marie Luginbill, Rockford, OH (US); Brett William Schultz, Burton, OH (US); Jerry Michael Welch, Holland, OH (US)

(73) Assignee: Eaton Corporation, Cleveland, OH (US)

( * ) Notice: Subject to any disclaimer, the term of this patent is extended or adjusted under 35 U.S.C. 154(b) by 314 days.

(21) Appl. No.: 12/393,176

(22) Filed: Feb. 26, 2009

(65) Prior Publication Data

US 2010/0215430 A1 Aug. 26, 2010

(51) Int. Cl.
*F16L 33/00* (2006.01)

(52) U.S. Cl. .................................. 285/242; 285/257

(58) Field of Classification Search .............. 285/256, 285/257, 259, 242, 252, 253, 254
See application file for complete search history.

(56) References Cited

U.S. PATENT DOCUMENTS

| | | | | |
|---|---|---|---|---|
| 511,138 A * | 12/1893 | Hallas | ............................ | 285/251 |
| 1,101,844 A * | 6/1914 | Gething | ........................ | 285/114 |
| 1,785,638 A * | 12/1930 | Ludwig | ........................ | 285/114 |
| 2,349,538 A * | 5/1944 | Craig | ............................ | 285/242 |
| 2,453,997 A | 11/1948 | MacWilliam | | |
| 2,455,760 A * | 12/1948 | Gustafson | ..................... | 285/114 |
| 3,174,777 A * | 3/1965 | Evans et al. | ................... | 285/252 |
| 3,431,161 A * | 3/1969 | Bernardino | ................ | 156/307.5 |
| 3,574,355 A * | 4/1971 | Oetiker | ........................... | 285/39 |
| 4,093,282 A * | 6/1978 | Kyriakodis | .................... | 285/114 |
| 4,537,183 A * | 8/1985 | Fogarty | ............................ | 600/40 |
| 4,607,867 A * | 8/1986 | Jansen | ........................... | 285/242 |
| 4,635,972 A * | 1/1987 | Lyall | ............................ | 285/242 |
| 4,703,134 A * | 10/1987 | Uematsu | ................ | 174/106 SC |
| 5,178,924 A * | 1/1993 | Johnson et al. | ............. | 428/41.4 |
| 5,954,372 A * | 9/1999 | Moynihan | ................ | 285/148.27 |
| 6,010,162 A * | 1/2000 | Grau et al. | ..................... | 285/257 |
| 6,231,085 B1 * | 5/2001 | Olson | ............................ | 285/23 |
| 6,772,519 B2 * | 8/2004 | St. James et al. | ........ | 29/890.144 |
| 7,108,291 B2 * | 9/2006 | Baxi et al. | ...................... | 285/257 |
| 2002/0088533 A1 * | 7/2002 | Mercure et al. | .............. | 156/179 |
| 2003/0038480 A1 * | 2/2003 | Aeberhard | ................ | 285/319 |
| 2004/0222631 A1 * | 11/2004 | Baxi et al. | ..................... | 285/252 |
| 2004/0229540 A1 * | 11/2004 | Akiba et al. | .................. | 442/327 |
| 2007/0126230 A1 * | 6/2007 | Feger et al. | .................... | 285/242 |

FOREIGN PATENT DOCUMENTS

FR 1429286 A 2/1966

* cited by examiner

*Primary Examiner* — Aaron Dunwoody
(74) *Attorney, Agent, or Firm* — Quinn Law Group, PLLC

(57) ABSTRACT

A coupling assembly includes a fitting having a wall presenting an inner surface, surrounding a lumen, and an outer surface, opposing the inner surface. A barb extends radially away from the outer surface of the wall to a peak. A seal circumferentially surrounds the outer surface of the wall and is spaced from the peak of the barb. A hose presents an initial outer diameter. The hose extends over each of the seal and the barb such that the hose is deformed at the barb to present a displaced outer diameter that is greater than the initial outer diameter of the hose. A cage is spaced at least a distance from the peak of the barb and radially compresses the exterior surface of the hose and the seal to form an interference fit between each of the hose, the barb, and the cage.

14 Claims, 5 Drawing Sheets

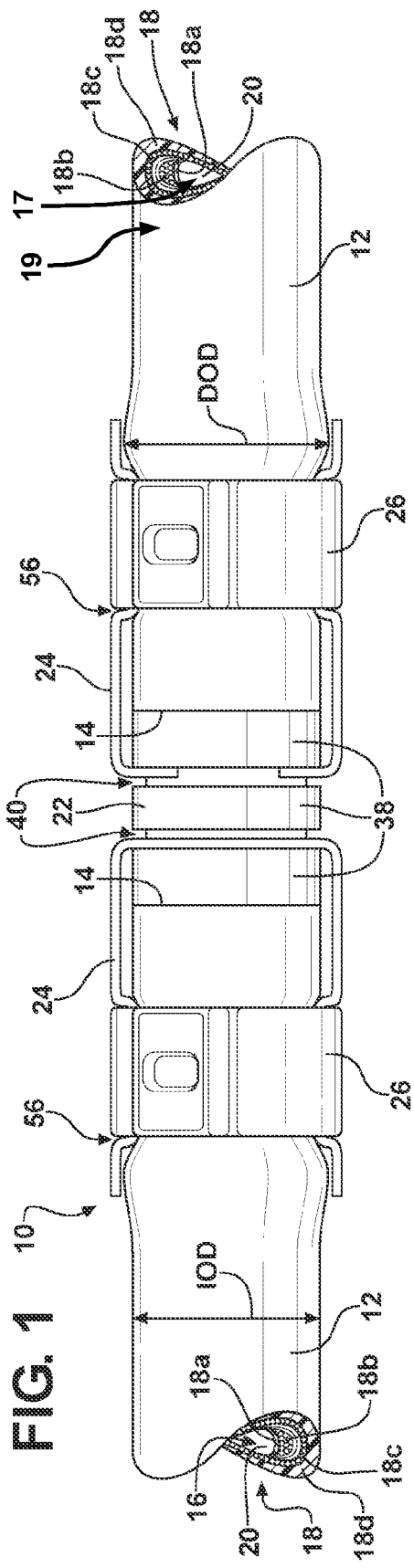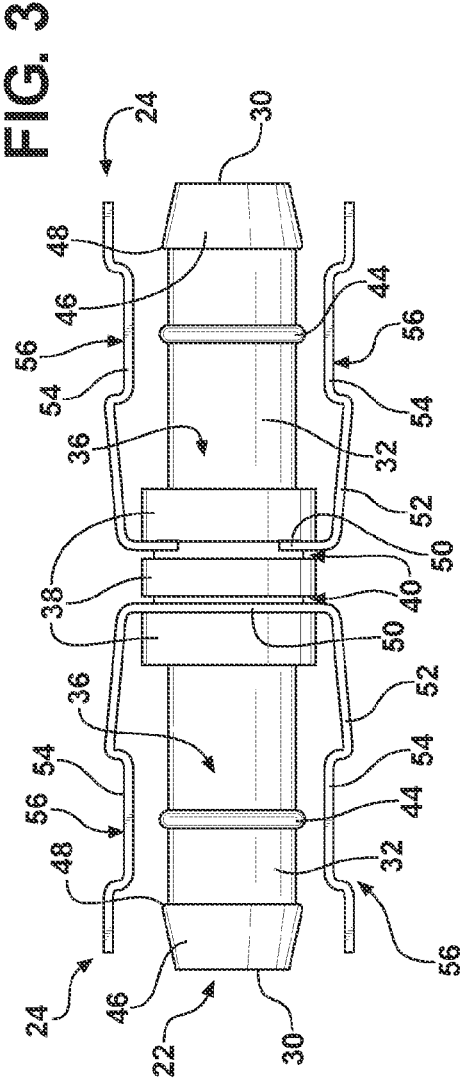

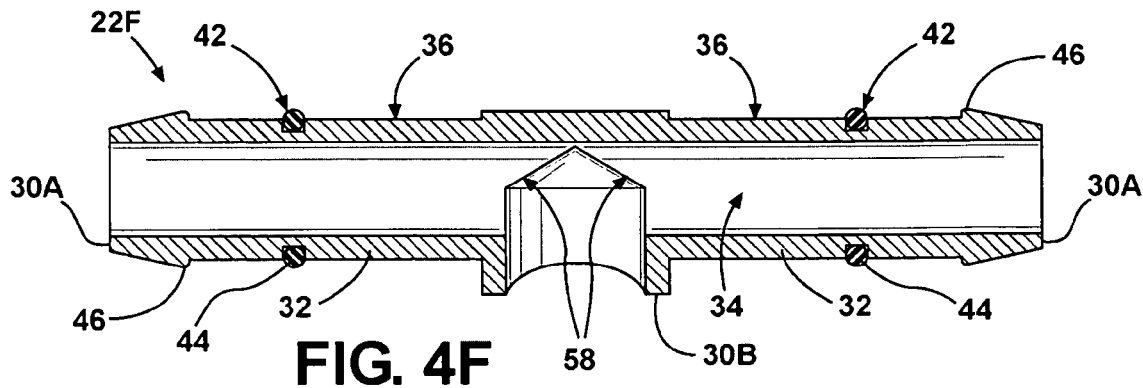
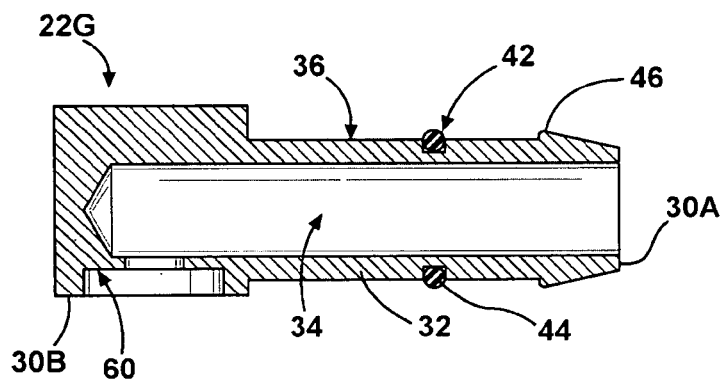
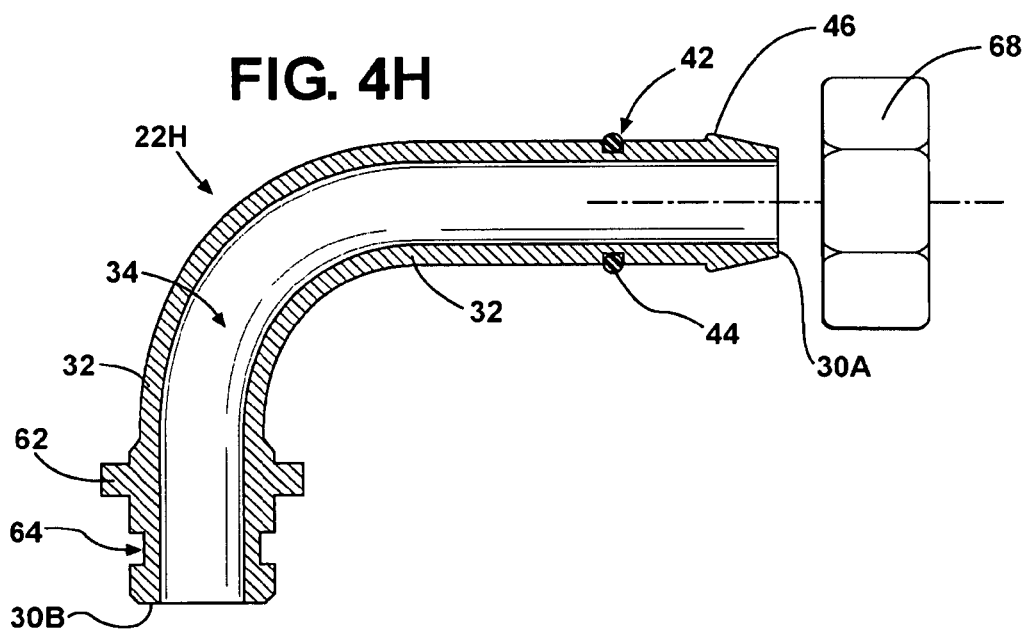

COUPLING ASSEMBLY FOR CONNECTION TO A HOSE

TECHNICAL FIELD

The present invention relates to a coupling assembly for connection to a hose.

BACKGROUND OF THE INVENTION

Beverage hoses are provided for fluid conveyance. The beverage hoses are typically formed from a plurality of layers of differing materials. A fitting typically interconnects the beverage hoses. The fittings include barbs having larger diameters that are embedded into a liner of the wall of the hose, creating a seal where fluid has no path for escape. With a growing trend in beverage products resorting to more pungent, volatile flavors, the materials of the beverage hoses have been modified to meet the challenges of flavor cross-over, i.e., permeation, and flavor scalping. The highly specialized materials that are currently meeting organoleptic and barrier requirements of the beverage hoses do not necessarily work well with the barbs on the fittings because stresses are imparted at the barb/liner interface. These stress points may lead to premature hose failure as a result of the barbs cutting through the liner, i.e., "delamination", allowing the flavor to cross-over into the hose.

SUMMARY OF THE INVENTION

A coupling assembly includes a fitting having a wall presenting an inner surface, surrounding a lumen, and an outer surface, opposing the inner surface. A barb extends radially away from the outer surface of the wall to a peak. A seal circumferentially surrounds the outer surface of the wall and is spaced from the peak of the barb. A hose has an interior surface surrounding a hollow interior and an exterior surface opposing the interior surface and presenting an initial outer diameter. The wall of the fitting is disposed in the hollow interior of the hose such that the hose extends over each of the seal and the barb so that the hose is deformed at the barb. This presents a displaced outer diameter, proximate the peak of the barb, that is greater than the initial outer diameter of the hose. A cage is spaced at least a distance from the peak of the barb and radially compresses the exterior surface of the hose and the seal. The hose is compressed to present a constricted outer diameter at the cage that is less than each of the initial outer diameter and the displaced outer diameter to form an interference fit between each of the hose, the barb, and the cage. The seal is in sealing engagement with the interior surface of the hose to prevent leakage of fluid from the coupling assembly.

A method of forming a coupling assembly for a fluid system includes providing a fitting including a wall presenting an outer surface and a barb extending radially away from the outer surface to a peak. A seal is placed circumferentially about the wall of the fitting, in spaced relationship to the barb. A hose, having an initial outer diameter, is placed over each of the barb and the seal such that the hose circumferentially surrounds the wall of the fitting and the hose forms a displaced outer diameter corresponding to the peak of the barb. A cage is placed circumferentially about the hose to radially surround each of the hose and the seal such that the cage is spaced at least a distance away from the peak of the barb. The cage is tightened about the hose to radially compress the exterior surface of the hose and the seal such that the hose is compressed to a constricted outer diameter that is less than each of the initial outer diameter and the displaced outer diameter to form an interference fit between each of the hose, the barb, and the cage. The seal is in sealing engagement with the interior surface of the hose to prevent leakage of fluid from the coupling assembly.

A coupling assembly includes a fitting having a wall extending between opposing ends and presenting an inner surface, surrounding a lumen and an outer surface opposing the inner surface. A band extends radially from the outer surface to surround the wall such that the wall extends from the band in opposing directions to the respective ends. A barb extends radially away from the outer surface of the wall, proximate each of the ends, to a respective peak. A seal circumferentially surrounds the outer surface of the wall between the band and each of the barbs. Each of a pair of hoses includes an interior surface surrounding a hollow interior and an exterior surface opposing the interior surface, presenting an initial outer diameter. The walls of the fitting are disposed in the hollow interior of a respective one of the hoses such that the respective one of the hoses extends over each of the respective seal and the respective barb such that the respective one of the hoses is deformed at the respective barb to present a displaced outer diameter proximate the respective peak of the respective barb that is greater than the initial outer diameter of the respective one of the hoses. Each of a pair of cages is spaced at least a distance from the peak of the barb and radially compresses each of the exterior surface of the respective hose and the respective seal such that the respective hose is compressed to a present a constricted outer diameter at the respective cage that is less than each of the initial outer diameter and the displaced outer diameter to form an interference fit between each of the respective one of the pair of hoses, the respective barb, and the respective cage. Each of the seals are in sealing engagement with the interior surface of the respective one of the pair of hoses to prevent leakage of fluid from the coupling assembly Accordingly, by using a fitting having a barb combined with a seal, the fitting is able to seal against an inside diameter of the supply hose to prevent the escape of fluid. In addition, by incorporating a cage to surround an outer diameter of the supply hose, a precise cage location of the supply hose to the fitting helps to ensure that the sealant point for the hose/fitting interface is directly located over the compressible o-ring, while preventing the barb from embedding into the hose.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 1 is a partial schematic side view of a coupling assembly showing a pair of hoses interconnected with a fitting, a pair of cages, and a pair of cages;

FIG. 3 is a schematic side view of the fitting and the pair of cages of the coupling assembly;

FIG. 4F is a schematic cross-sectional side view of another embodiment of the fitting having a barbed end and configured for connected to the hose;

FIG. 4G is a schematic cross-sectional side view of another embodiment of the fitting having a barbed end and configured for connection to the hose;

FIG. 4H is a schematic cross-sectional side view of another embodiment of the fitting having a barbed end and configured for connected to the hose;

DESCRIPTION OF THE PREFERRED EMBODIMENTS

Figure 2:
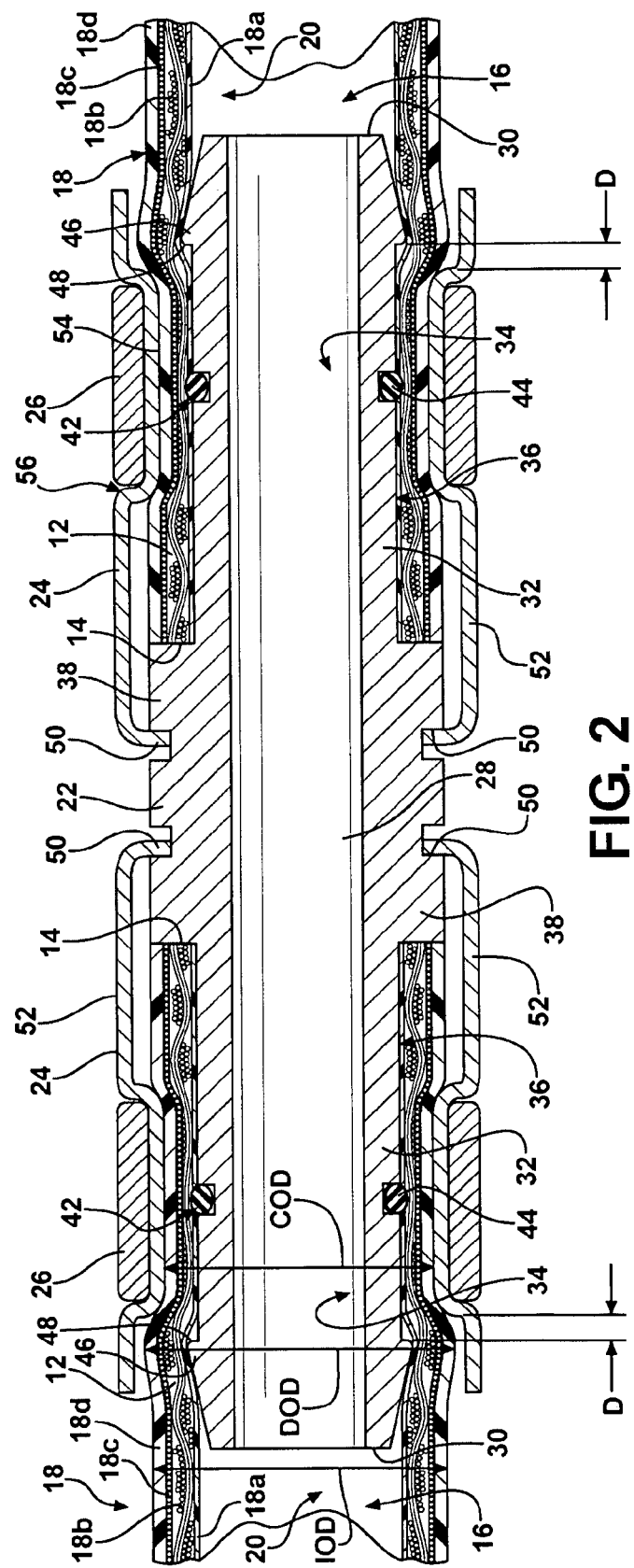
FIG. 2 is schematic partial cross-sectional side view of the coupling assembly of FIG. 1.

Referring to the drawings, wherein like reference numbers refer to like components, FIG. 1 shows a coupling assembly 10 interconnecting a pair of hoses 12. The coupling assembly 10 may be used to couple hoses 12 for the conveyance of fluids within a fluid system (not shown). For example, the fluid system may be a beverage system. It should be appreciated, however, that the coupling assembly 10 is not limited to being used in a beverage system, as the coupling assembly 10 may be used in other fluid conveyance systems known to those skilled in the art. The coupling assembly 10 is configured to interconnect the pair of hoses 12 such that the coupling assembly 10 withstands at least two times a working pressure of the fluid system without leakage.

The hoses 12 each extend to a terminus 14 and define a hollow interior 16 extending therethrough, as shown in FIG. 2. The hoses 12 may be formed from a material approved for use in the beverage industry and the like. Each hose 12 includes an inner surface 17 surrounding the hollowing interior 16. An exterior surface 19 opposes the interior surface 17. The exterior surface 19 presents an initial outer diameter IOD. The hose 12 may be formed to include a plurality of layers 18. The layers 18 may include a contact layer 18a, a backing layer 18b, a reinforcement layer 18c, and a sheath 18d. It should be appreciated that more or less layers 18 may be used as known to those skilled in the art. The contact layer 18a surrounds the hollow interior 16 and comes into direct contact with the fluid flowing through the hose 12. Therefore, the contact layer 18a is formed from a material that is compatible with the fluid, such as a thermoplastic material. More specifically, the thermoplastic material may be formed from polyethylene terephthalate (PET), polyester, and the like. The contact layer 18a presents a non-porous, non-wetting, smooth contact surface 20 that enhances flushability of the hose 12, improves flow of the fluid through the hose 12, and hinders microbial growth within the hose 12. The backing layer 18b surrounds the contact layer 18a and may be formed from a blend of polyethylene and a linear low-density polyethylene (LLDPE) or any other suitable material known to those skilled in the art. The reinforcement layer 18c surrounds the backing layer 18b and may be formed from a twisted polyester yarn or any other materials known to those skilled in the art. The sheath 18d surrounds the reinforcement layer 18c and provides an outer-most protective barrier to the exterior of the hose 12. The sheath 18d may be formed from an ethylene vinyl acetate copolymer (EVA) or any other materials known to those skilled in the art.

The coupling assembly 10 includes a fitting 22, a pair of cages 24, and a pair of cages 26. Referring to FIG. 2, the fitting 22 is generally tubular and defines a lumen 28 extending therethrough, between opposing ends 30. The fitting 22 includes a wall 32 that presents an inner surface 34 that surrounds the lumen 28 and an outer surface 36 that opposes the inner surface 34, as shown in FIG. 3. A band 38 radially extends from the outer surface 36 to surround the wall 32. The band 38 may generally bisect the wall 32 such that the wall 32 extends from the band 38 in opposing directions to the respective end 30. A pair of grooves 40 is defined in the band 38 in spaced relationship to one another. Each of the grooves 40 extends generally circumferentially about the band 38. The outer surface 36 of the wall 32 may define a pair of channels 42 that surround the lumen 28 on opposing sides of the band 38. Therefore, each channel 42 is defined in the wall 32 between the band 38 and the respective end 30. A seal 44, such as an O-ring, may be disposed in each channel 42 to provide sealing engagement between the lumen 28 and the corresponding hose 12, as described in more detail below. A barb 46 may extend radially away from the outer surface 36 of the wall 32, proximate the respective end 30 of the fitting 22 such that each barb 46 is disposed between one of the channels 42 and the respective end 30. Each barb 46 generally surrounds the lumen 28 and is generally frustoconical in shape. Each barb 46 is configured to provide a general interference fit with the corresponding hose 12, as described in more detail below. Each barb 46 extends to a peak 48 that is generally rounded so that the corresponding hose 12 is guided around the barb 46, as described in more detail below. The fitting 22 may be formed via injection-molding from a thermoplastic material. More specifically, the thermoplastic material may be polyethylene, polyurethane, glass-filled nylon, nano-materials (i.e., nano-composites, etc.), and the like. Alternatively, the fitting 22 may be formed from stainless steel. It should be appreciated, however, that the fitting 22 may be formed from any other material known to those skilled in the art so long as the material is suitable for use with the respective fluid at the desired pressure, temperature, and the like. For example, the material must be approved for use in the beverage industry if the fitting 22 will be used for beverage dispensing.

Each cage 24 includes a base 50 and a pair of arms 52 that extend generally perpendicularly from the base 50 in spaced and generally parallel relationship to one another. Each arm 52 includes a receiving portion 54 that is off-set from the arm 52 to define a relief 56 that is configured for receiving the respective cage 26 therein. The base 50 is generally C-shaped and is configured to be disposed in the respective channel 42 of the band 38 such that base 50 snaps at least partially around the band 38 of the fitting 22, within the channel 42, to retain the cage 26 to the fitting 22. The base 50 is at least partially sandwiched by the band 38 to prevent the cage 24 from moving along the fitting 22 relative to the ends 30. When the cage 24 is attached to the fitting 22, each arm 52 of the respective cage 24 is configured to extend from the base 50 to the respective end 30 of the fitting 22 such that the wall 32 is disposed therebetween. The reliefs 56 of each arm 52 are configured to correspond with the groove 40 and the O-ring 44. Therefore, when the cage 26 is placed within the reliefs 56 of the respective pair of arms 52 and tightened about the hose 12, the band compresses the hose 12 such that the O-ring 44 forms a seal between the hose 12 and the wall 32 of the fitting 22. This seal prevents leakage between the fitting 22 and the hose 12. The cage 24 may be formed from aluminum, steel, plastic, and the like. In one embodiment, the fitting 22 and the cages 24 are formed as a single component via injection molding. It should be appreciated, however, that the cage 24 may also be formed from any method or material known to those skilled in the art.

During assembly, each hose 12 is mounted over the respective end 30 of the fitting 22 such that each hose 12 extends over the respective barb 46 and the adjacent O-ring 44. The barbs 46 and the hoses 12 are sized such that there is an interference fit therebetween. The cages 24 may be preassembled to the fitting 22 or attached to the fitting 22 after the hoses 12 are mounted to the fitting 22. Once the hoses 12 and the cages 24 are attached to the fitting 22, each receiving portion 54 and relief 56 extends over the respective O-ring 44. The cages 26 are placed within the relief 56 of the respective cage 24 and tightened such that the receiving portions 54 of each of the opposing arms 52 of the cage 24 compress and are embedded into the exterior surface 19 of the sheath 18d of the corresponding hose 12. Therefore, the initial outer diameter IOD of the hose 12 is reduced by tightening the cages 26. The barb 46 is configured to be spaced a distance D of at least 0.060 inches from the relief 56 portions of the arms 52 of the corresponding cage 24. This spacing allows the contact layer 18a of the hose 12 to adequately extend around the barb 46 such that the barb 46 is prevented from being embedded into the contact layer 18a of the hose 12. Therefore, by making the peak 48 of the barb 46 rounded, the barb 46 merely displaces the hose 12 radially away from the barb 46, to form a displaced outer diameter DOD that is larger than the initial outer diameter IOD. The cage 26 is tightened about the hose 12 such that the hose 12 at the receiving portion 54 has a constricted outer diameter COD that is less than the displaced outer diameter DOD of the hose 12 at the peak 48 of the barb 46 and the initial outer diameter IOD, creating an interference fit. This interference fit traps the hose 12 between the barb 46 and the receiving portion 54 to prevent the hose 12 from blowing off the fitting 22 as fluid travels therethrough or from slipping off of the fitting 22 as the hose 12 and the connection assembly are moved during use of the fluid system.

Figure 4A:
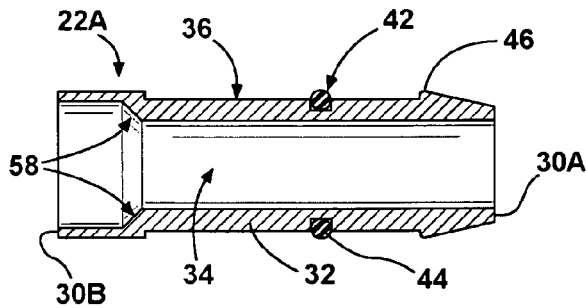
FIG. 4A is a schematic cross-sectional side view of another embodiment of the fitting having a barbed end and configured for connection to the hose.
Figure 4B:
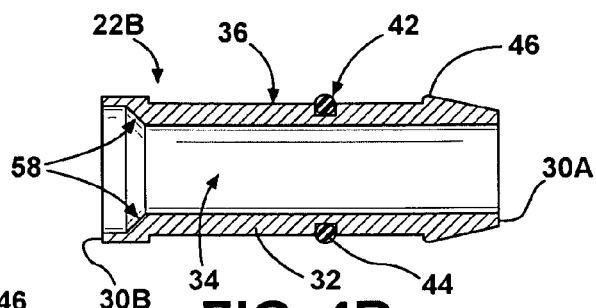
FIG. 4B is schematic cross-sectional side view of another embodiment of the fitting having a barbed end and configured for connection to the hose.

The fittings 22 may also be configured as shown in FIGS. 4A-4J, 22A, 22B, 22C, 22D, 22E, 22F, 22G, 22H, 22I, and 22J, respectively. Each of the fittings 22A-22J includes a wall 32 surrounding an inner surface. Each of the fittings 22A-22J extends to at least one end 30A having the barb 46, the groove 42, and the O-ring 22 for disposition into the corresponding hose 12. Referring to FIGS. 4A and 4B, the fittings 22A, 22B each extend to only one end 30A having the barb 46, the groove 42, and the O-ring 44 for disposition into the hose 12. In these embodiments, the opposing end 30B defines a tapered seat 58 for receiving another hose, fitting, and the like.

Figure 4C:
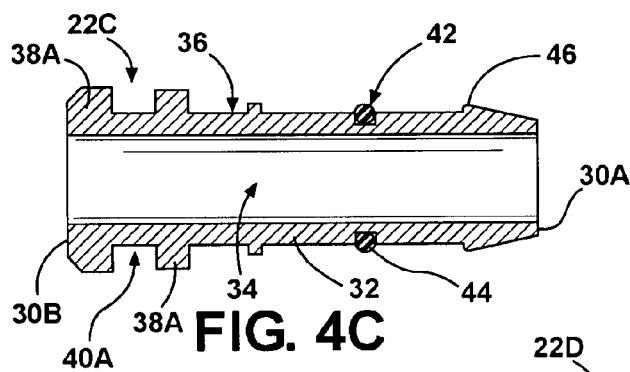
FIG. 4C is a schematic cross-sectional side view of another embodiment of the fitting having a barbed end and configured for connected to the hose.

Referring to FIG. 4C, the fitting 22C extends to only one end 30A having the barb 46, the groove 42, and the O-ring 44 for disposition into the hose 12. In this embodiment, the band 38A extends from an outer surface 36 of the wall 32 with a groove 40A defined in the band 38A, proximate the opposing end 30B.

Figure 4D:
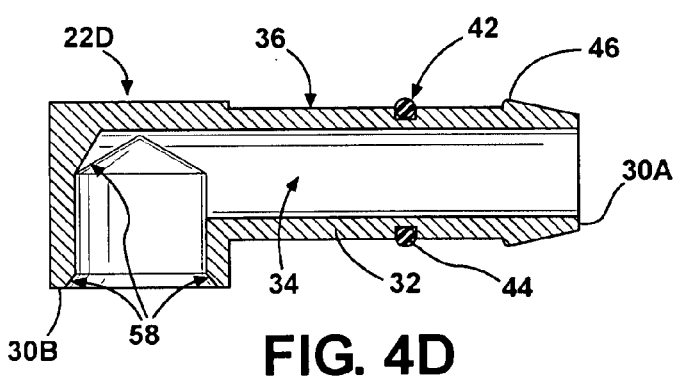
FIG. 4D is a schematic cross-sectional side view of another embodiment of the fitting having a barbed end and configured for connected to the hose.

Referring to FIG. 4D, the fitting 4D extends to only one end 30A having the barb 46, the groove 42, and the O-ring 44 for disposition into the hose 12. In this embodiment, the opposing end 30B is oriented generally perpendicular to the first end 30A. The opposing end 30B defines the tapered seat 58 for receiving another hose, fitting, and the like.

Figure 4E:
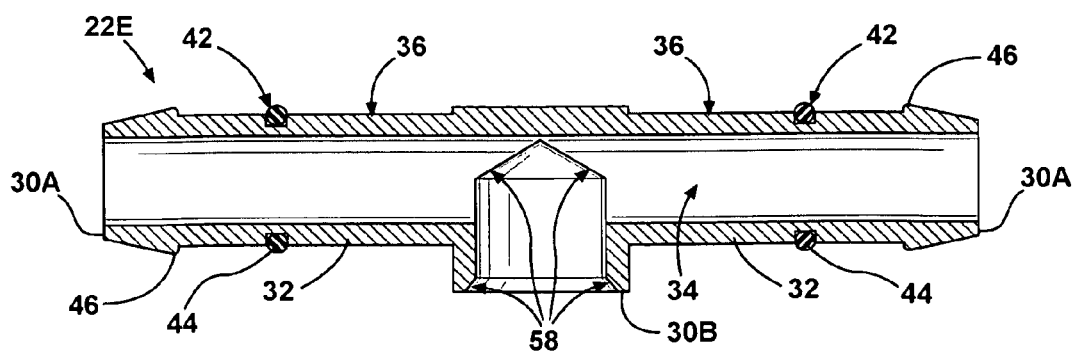
FIG. 4E is a schematic cross-sectional side view of another embodiment of the fitting having a barbed end and configured for connected to the hose.

Referring to FIGS. 4E and 4F, the fittings 22E, 22F each extend between two opposing ends 30A, each having the barb 46, the groove 42, and the O-ring 44 for disposition into the respective hose 12. In these embodiments, the walls each define a tapered seat 58 between the ends.

Referring to FIG. 4G, the fitting 4G extends to only one end 30A having the barb 46, the groove 42, and the O-ring 44 for disposition into the hose 12. In this embodiment, the opposing end 30B is oriented generally perpendicular to the first end 30A. The opposing end defines a bore 60 configured for receiving another hose, fitting, and the like.

Referring to FIG. 4H, the fitting 4H extends to only one end 30A having the barb 46, the groove 42, and the O-ring 44 for disposition into the hose 12. In this embodiment, a collar 62 extends from the exterior surface 36 of the wall 32, proximate the opposing end 30B. Additionally, the wall 32 defines a recess 64 proximate the opposing end 30B. The collar 62 and the recess 64 are configured to mate with a special connector (not shown) such that a nut 68 may be slid over the external surface 36 of the wall 32 of the fitting 4H to be threaded to the special connector. Therefore, the nut 68 is trapped between the collar 62 and the special connector to retain the fitting 4H to the special connector. It should be appreciated that the nut 68 is not necessarily required with this fitting 4H.

Figure 4I:
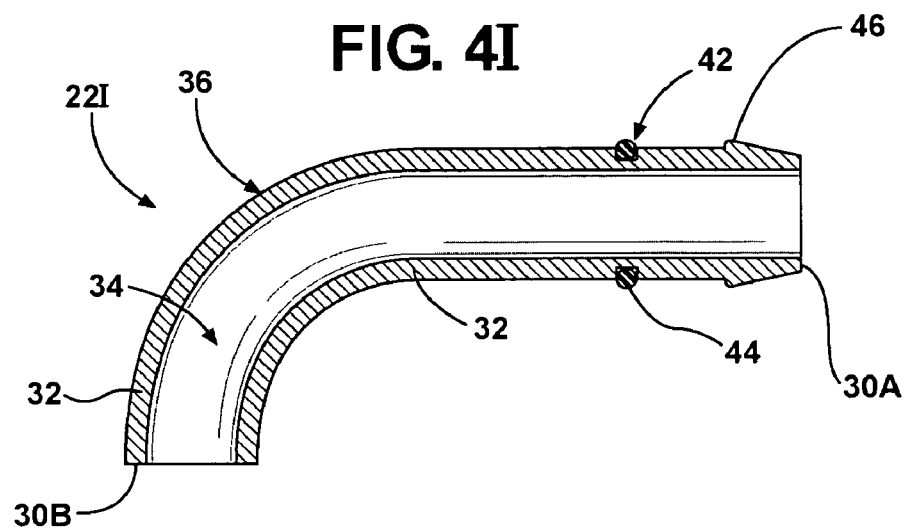
FIG. 4I is a schematic cross-sectional side view of another embodiment of the fitting having a barbed end and configured for connected to the hose.

Referring to FIG. 4I, the fitting 4I extends to only one end 30A having the barb 46, the groove 42, and the O-ring 44 for disposition into the hose 12. In this embodiment, the wall 32 of the fitting 4I extends to an opposing end 30B that is just the wall 32.

Figure 4J:
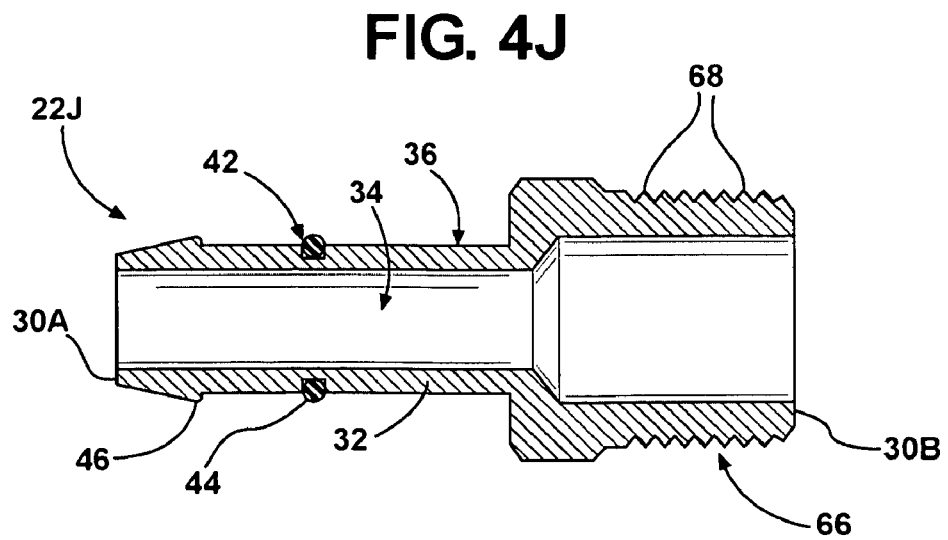
FIG. 4J is a schematic cross-sectional side view of another embodiment of the fitting having a barbed end and configured for connected to the hose.

Referring to FIG. 4J, the fitting 4J extends to only one end 30A having the barb 46, the groove 42, and the O-ring 44 for disposition into the hose 12. In this embodiment, the wall extends to an opposing end 30B having a pipe thread connector 66 having external threads 68. It should be appreciated, however, that the pipe thread connector 66 is not limited to having external threads 68, as the pipe thread connector may have threads that are internal.

It should also be appreciated that the invention is not limited to the fittings shown and described herein, as any other fitting having at least one end 30A having the barb 46, the groove 42, and the O-ring for disposition into the hose may be used as known to those skilled in the art.

While the best modes for carrying out the invention have been described in detail, those familiar with the art to which this invention relates will recognize various alternative designs and embodiments for practicing the invention within the scope of the appended claims.

The invention claimed is:

1. A coupling assembly comprising:
   a fitting including a wall presenting an inner surface, surrounding a lumen and an outer surface opposing said inner surface;
   a barb extending radially away from said outer surface of said wall to a peak;
   a seal circumferentially surrounding said outer surface of said wall and spaced from said peak of said barb;
   a hose including a contact layer, a backing layer, a reinforcing layer, and a sheath;
   wherein said contact layer presents an interior surface surrounding a hollow interior and said sheath surrounds said contact layer and presents an exterior surface opposing said interior surface and presenting an initial outer diameter;
   wherein said backing layer surrounds said contact layer, said reinforcement layer surrounds said backing layer, and said sheath surrounds said reinforcement layer;

wherein said wall of said fitting is disposed in said hollow interior of said hose such that said contact layer of said hose extends over each of said seal and said barb such that said hose is deformed at said barb to present a displaced outer diameter proximate said peak of said barb that is greater than said initial outer diameter of said hose;

wherein said barb is not embedded into said contact layer of said hose;

a cage spaced at least a distance from said peak of said barb and radially compressing each of said exterior surface of said hose and said seal such that said hose is compressed to present a constricted outer diameter at said cage that is less than said initial outer diameter and said displaced outer diameter to form an interference fit between each of said hose, said barb, and said cage;

wherein said seal is in sealing engagement with said interior surface of said hose to prevent leakage of fluid from said coupling assembly.

2. A coupling assembly, as set forth in claim 1, wherein said exterior surface of said wall defines a channel extending circumferentially about said wall and said seal is at least partially disposed in said channel.

3. A coupling assembly, as set forth in claim 1, wherein said seal is an O-ring.

4. A coupling assembly, as set forth in claim 1, wherein said distance is at least 0.060 inches.

5. A coupling assembly, as set forth in claim 1, wherein said peak is rounded.

6. A coupling assembly, as set forth in claim 1, further comprising a cage having a base and at least one arm extending generally perpendicularly from said base;

wherein said base is in engagement with said fitting;

wherein said at least one arm includes a receiving portion that is off-set from said at least arm and defines a relief therein;

wherein said receiving portion is radially disposed over each of said exterior surface of said hose and said seal;

wherein said cage is disposed in said relief such that said cage radially compresses each of said receiving portion, said exterior surface of said hose, and said seal to at least partially embed said receiving portion within said outer surface of said hose to present said constricted outer diameter and form an interference fit between each of said hose, said barb, said cage, and said cage.

7. A coupling assembly, as set forth in claim 6, wherein said fitting further includes a band radially surrounding said outer surface of said wall, wherein said band defines a groove extending circumferentially about said band;

wherein said base is generally C-shaped and at least partially extends about said band within said groove such that said cage is retained to said fitting.

8. A coupling assembly, as set forth in claim 6, wherein said cage includes a pair of arms extending from said base in spaced and generally parallel relationship to one another and said wall is disposed between said pair of arms.

9. A coupling assembly, as set forth in claim 1, wherein said contact layer is formed from a thermoplastic material.

10. A coupling assembly, as set forth in claim 9, wherein said thermoplastic material is selected from at least one of a polyethylene terephthalate and a polyester.

11. A coupling assembly, as set forth in claim 1, wherein said sheath is formed from an ethylene vinyl acetate copolymer.

12. A coupling assembly, as set forth in claim 1, wherein said backing layer is formed from at least one of a polyethylene and a linear low-density polyethylene.

13. A coupling assembly, as set forth in claim 1, wherein said reinforcement layer is formed from a twisted polyester yarn.

14. A coupling assembly comprising:

a fitting including a wall extending between opposing ends and presenting an inner surface, surrounding a lumen, and an outer surface, opposing said inner surface;

a band extending radially from said outer surface to surround said wall such that said wall extends from said band in opposing directions to said respective ends;

a barb extending radially away from said outer surface of said wall, proximate each of said ends, to a respective peak;

a seal circumferentially surrounding said outer surface of said wall between said band and each of said barbs;

a pair of hoses, wherein each of said hoses presents an initial outer diameter and includes an interior surface, surrounding a hollow interior, and an exterior surface, opposing said interior surface;

wherein said walls of said fitting are disposed in said hollow interior of a respective one of said hoses such that said respective one of said hoses extends over each of said respective seal and said respective barb such that said respective one of said hoses is deformed at said respective barb to present a displaced outer diameter proximate said respective peak of said respective barb that is greater than said initial outer diameter of said respective one of said hoses;

a pair of cages, wherein each of said pair of cages is spaced at least a distance from said peak of said barb and radially compresses each of said exterior surface of said respective hose and said respective seal such that said respective hose is compressed to present a constricted outer diameter at said respective cage that is less than each of said initial outer diameter and said displaced outer diameter to form an interference fit between each of said respective one of said pair of hoses, said respective barb, and said respective cage;

wherein each of said seals are in sealing engagement with said interior surface of said respective one of said pair of hoses to prevent leakage of fluid from said coupling assembly.

* * * * *